United States Patent
Miyasaka et al.

(10) Patent No.: US 9,353,239 B2
(45) Date of Patent: May 31, 2016

(54) RUBBER WET MASTERBATCH

(71) Applicant: Toyo Tire & Rubber Co., Ltd., Osaka-shi, Osaka (JP)

(72) Inventors: Takashi Miyasaka, Osaka (JP); Makoto Tanaka, Osaka (JP); Norio Minouchi, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/398,917

(22) PCT Filed: May 20, 2013

(86) PCT No.: PCT/JP2013/063892
§ 371 (c)(1),
(2) Date: Nov. 4, 2014

(87) PCT Pub. No.: WO2014/057705
PCT Pub. Date: Apr. 17, 2014

(65) Prior Publication Data
US 2015/0133592 A1  May 14, 2015

(30) Foreign Application Priority Data
Oct. 11, 2012 (JP) ................. 2012-226079

(51) Int. Cl.
| | | |
|---|---|---|
| *C08J 3/20* | (2006.01) | |
| *C08K 3/04* | (2006.01) | |
| *B60C 1/00* | (2006.01) | |
| *C08L 21/02* | (2006.01) | |
| *C08J 3/22* | (2006.01) | |

(52) U.S. Cl.
CPC ... *C08K 3/04* (2013.01); *B60C 1/00* (2013.01); *C08J 3/22* (2013.01); *C08L 21/02* (2013.01); *C08J 2307/02* (2013.01); *C08K 2201/006* (2013.01)

(58) Field of Classification Search
CPC ............ C08K 3/04; C08J 3/22; C08J 2307/02
See application file for complete search history.

(56) References Cited

U.S. PATENT DOCUMENTS

| | | | | |
|---|---|---|---|---|
| 7,156,138 B2 * | 1/2007 | Suzuki | .......................... | 152/526 |
| 7,238,741 B2 * | 7/2007 | Wang et al. | .................. | 524/496 |
| 8,053,496 B1 * | 11/2011 | Minouchi et al. | ............. | 523/351 |
| 8,110,620 B1 * | 2/2012 | Minouchi | ..................... | 523/351 |
| 2003/0088006 A1 | 5/2003 | Yanagisawa et al. | | |
| 2009/0043014 A1 * | 2/2009 | Narita et al. | .................. | 523/351 |
| 2010/0144951 A1 | 6/2010 | Yamada et al. | | |

FOREIGN PATENT DOCUMENTS

| | | |
|---|---|---|
| JP | 2004-099625 A | 4/2004 |
| JP | 2005-067358 A | 3/2005 |
| JP | 2006-213804 A | 8/2006 |
| JP | 2006-225560 A | 8/2006 |
| JP | 4738551 B1 | 8/2011 |
| JP | 2012-184354 A | 9/2012 |

OTHER PUBLICATIONS

International Search Report dated Aug. 13, 2014, issued in corresponding application No. PCT/JP2013/063892.
Notification of transmittal of Translation of the International Preliminary Report on Patentability (Chapter I or Chapter II) (Form PCT/IB/338) of International Application No. PCT/JP2013/063892 mailed Apr. 23, 2015, with forms PCT/IB/373 and PCT/ISA/237. (6 pages).

* cited by examiner

*Primary Examiner* — Hannah Pak
(74) *Attorney, Agent, or Firm* — Westerman, Hattori, Daniels & Adrian, LLP

(57) ABSTRACT

A rubber wet masterbatch obtained, using at least a carbon black, a dispersing solvent, and a latex solution of a rubber as raw materials, the carbon black being a carbon black having an iodine adsorption number of 41 mg/g or less, and the rubber wet masterbatch being obtained through the following process: a process in which at the time of dispersing the carbon black into the dispersing solvent, at least one portion of the rubber latex solution is added to the carbon-black-dispersed solvent to produce a slurry solution comprising the carbon black to which rubber latex particles adhere, subsequently the slurry solution is mixed with the rest of the rubber latex solution, and next the mixture is solidified and dried.

9 Claims, No Drawings

RUBBER WET MASTERBATCH

TECHNICAL FIELD

The present invention relates to a rubber wet masterbatch obtained, using at least a carbon black, a dispersing solvent, and a latex solution of a rubber as raw materials.

BACKGROUND ART

In the rubber industry, it has been hitherto known that at the time of producing a rubber composition containing a carbon black, or a carbon black species, a rubber wet masterbatch is used to improve the rubber composition in workability and carbon black dispersibility. This is a technique of: mixing the carbon black beforehand with a dispersing solvent at a predetermined ratio; using mechanical force to mix the resultant carbon-black-containing slurry solution, in which the carbon black is dispersed in the dispersing solvent, with a rubber latex solution in a liquid phase; subsequently adding a solidifier such as an acid to the mixture to yield a solidified product; collecting the product; and then drying the product. In the case of using a rubber wet masterbatch, a rubber composition is obtained which is better in carbon black dispersibility and in rubber properties, such as workability and reinforceability, than in the case of using a rubber dry masterbatch obtained by mixing a carbon black with a rubber in a solid phase. The use of such a rubber composition as a raw material makes it possible to produce a rubber product, such as a pneumatic tire having, for example, a decreased rolling resistance, and an excellent fatigue resistance.

As a method for producing a natural-rubber wet rubber masterbatch, Patent Document 1 listed below describes a natural-rubber wet masterbatch producing method including the step of mixing a slurry solution in which a carbon black is beforehand dispersed in water with a natural rubber latex, the method being a method wherein about the particle size distribution of the carbon black in the slurry solution, the 90% by volume particle diameter (D90) of the carbon black is adjusted to 30 μm or less. As a natural-rubber wet masterbatch rubber composition, Patent Document 2 listed below describes a natural-rubber wet masterbatch rubber composition obtained by a production method of mixing a natural rubber latex with a slurry solution in which a carbon black is beforehand dispersed in water.

PRIOR ART DOCUMENTS

Patent Documents

Patent Document 1: JP-A-2004-99625
Patent Document 2: JP-A-2006-213804
Patent Document 3: Japanese Patent No. 4738551

SUMMARY OF THE INVENTION

Problems to be Solved by the Invention

However, the present inventors have made eager investigations to find out that in a vulcanized rubber made from a natural-rubber wet masterbatch rubber composition obtained by the production method described in each of the Patent Documents, there is a room for a further improvement from the viewpoint of low thermogenic performance and fatigue resistance. Additionally, the production methods described in these documents have the step of mixing a natural rubber latex with a slurry solution in which a carbon black is beforehand dispersed in water; thus, when much time is required until the step of mixing the natural rubber latex with the slurry solution after the preparation of the solution, the re-flocculation of the carbon black and others in the slurry solution advances easily. Furthermore, even after the mixture is made into a natural rubber wet masterbatch, the re-flocculation of the carbon black advances easily. As a result, it is feared that a poor dispersion of the carbon black may be locally caused in the rubber composition to be finally obtained. The present inventors have found out this inconvenience. When the re-flocculation of the carbon black advances in the natural rubber wet masterbatch as well as in the slurry solution, so that the poor dispersion of the carbon black is locally caused, the resultant is lowered in physical properties of the following: low thermogenic performance and fatigue resistance. In the actual circumstance, accordingly, a method for producing a rubber wet masterbatch has a room for a further improvement when physical properties of the vulcanized rubber to be finally obtained are considered.

In recent years, in order to decrease the rolling resistance of tires, which is closely related to fuel consumption, a pneumatic tire has been suggested in which rubber elements, such as a tread rubber, a sidewall rubber and a ply rubber, are made of a non-electroconductive rubber into which silica is incorporated in a high proportion. However, the rubber elements are higher in electric resistance than conventional products into which a carbon black is incorporated in a high proportion. Thus, the rubber elements hinder the discharge of static electricity generated in the tire and the car body to road surfaces to cause a problem that inconveniences such as radio noises are easily generated. Thus, in the actual circumstances, in particular, tread rubbers, sidewall rubbers, ply rubbers, and rubber elements similar thereto are required to attain the compatibility of low thermogenic performance with a decrease in electric resistance.

Patent Document 3 listed above describes a rubber wet masterbatch obtained through a process in which at the time of dispersing a filler into a dispersing solvent, at least one portion of a rubber latex solution is added to the filler-dispersed solvent to produce a slurry solution containing a rubber-latex-particle-adhering filler, the slurry solution is subsequently mixed with the rest of the rubber latex solution and next the mixture is solidified and dried. However, this patent document does not refer to the electric resistance of a vulcanized rubber obtained using the rubber wet masterbatch as a raw material. The document includes no description about any filler, in particular, no description about the restriction of any carbon black.

In light of the above-mentioned actual circumstances, the present invention has been made. An object thereof is to provide a rubber wet masterbatch in which a carbon black is evenly dispersed and the re-flocculation of the carbon black is restrained even when time elapses, this masterbatch being further a masterbatch which is a raw material of a vulcanized rubber which attains the compatibility of low thermogenic performance and fatigue resistance with a decrease in electric resistance.

Means for Solving the Problems

The object can be attained by the present invention, which is a rubber wet masterbatch obtained, using at least a carbon black, a dispersing solvent, and a latex solution of a rubber as raw materials, the carbon black being a carbon black having an iodine adsorption number of 41 mg/g or less, and the rubber wet masterbatch being obtained through the following process: a process in which at the time of dispersing the carbon black into the dispersing solvent, at least one portion of the rubber latex solution is added to the carbon-black-dispersed solvent to produce a slurry solution containing the carbon black to which rubber latex particles adhere, subsequently the slurry solution is mixed with the rest of the rubber latex solution, and next the mixture is solidified and dried. This rubber wet masterbatch is a rubber wet masterbatch in which the carbon black is evenly dispersed so that the dispersion stability of the carbon black is excellent over elapsing time, and the masterbatch can be a raw material of a vulcanized rubber excellent in low thermogenic performance and fatigue resistance. Furthermore, the carbon black used is a carbon black having an iodine adsorption number of 41 mg/g or less. Thus, particles of the carbon black are close in distance to each other into such an appropriate degree that electrons can be transmitted therebetween while the carbon black is evenly dispersed in the rubber wet masterbatch. As a result, a vulcanized rubber using this rubber wet masterbatch can be decreased in electric resistance while improved in low thermogenic performance and fatigue resistance.

In the rubber wet masterbatch, it is preferred that the carbon black has a DBP absorption number of 80 cm$^3$/100 g or less. The use of this carbon black makes it possible to further decrease the vulcanized rubber to be finally obtained in electric resistance.

It is preferred that the rubber wet masterbatch contains 40 to 150 parts by mass of the carbon black for 100 parts by mass of the rubber. This case makes it possible to improve the vulcanized rubber to be finally obtained in low thermogenic performance, fatigue resistance, and an electric resistance decrease with a good balance between the former two properties and the latter.

Another aspect of the present invention relates to a rubber composition containing the rubber wet masterbatch recited in any one of the above-mentioned paragraphs concerned. This rubber composition can be a raw material of a vulcanized rubber that attains the compatibility of low thermogenic performance and fatigue resistance with a decrease in electric resistance. Furthermore, the rubber composition preferably contains the rubber wet masterbatch recited in any one of the paragraphs concerned, and a dry rubber containing, as a main component, a diene based rubber. This case makes a further improvement of the vulcanized rubber to be finally obtained in thermogenic performance and fatigue resistance.

Still another aspect of the present invention relates to a vulcanized rubber obtained by vulcanizing the rubber composition recited in any one of the above-mentioned paragraphs concerned. This vulcanized rubber is a rubber improved in low thermogenic performance, fatigue resistance, and an electric resistance decrease with a good balance between the former two properties and the latter. For decreasing the electric resistance, the vulcanized rubber preferably has an electric resistance value less than $10^8$ Ω·cm. For ensuring low thermogenic performance, the real number of the loss tangent (tan δ) of the vulcanized rubber is preferably 0.120 or less.

As described above, the vulcanized rubber according to the present invention is improved in low thermogenic performance, fatigue resistance, and an electric resistance decrease with a good balance between the former two properties and the latter. Therefore, when the vulcanized rubber is used as a ply topping rubber for tires, static electricity generated in the tires and the car body is easily discharged to road surfaces, not to easily cause inconveniences, such as radio noises.

MODE FOR CARRYING OUT THE INVENTION

The rubber wet masterbatch of the present invention is obtained through the following process: a process in which at the time of dispersing a carbon black into a dispersing solvent, at least one portion of a latex solution of a rubber is added to the carbon-black-dispersed solvent to produce a slurry solution containing the carbon black to which rubber latex particles adhere, subsequently the slurry solution is mixed with the rest of the rubber latex solution, and next the mixture is solidified and dried.

The carbon black used in the present invention is a carbon black having an iodine adsorption number of 41 mg/g or less. In order for the vulcanized rubber to be further decreased in electric resistance, the DBP absorption number of the carbon black is preferably 160 cm$^3$/100 g or less, more preferably 100 cm$^3$/100 g or less, in particular preferably 80 cm$^3$/100 g or less. When the rubber is considered about thermogenic performance and other properties, the nitrogen specific surface area of the carbon black is preferably 40×10$^3$ m$^2$/kg or more. The carbon black may be any granulated carbon black, which has been granulated considering the handleability thereof in an ordinary rubber industry; or any non-granulated carbon black.

The dispersing solvent is in particular preferably water. The solvent may be, for example, water containing an organic solvent.

The rubber latex solution may be any one of natural rubber latex solutions and synthetic rubber latex solutions.

The natural rubber latex solutions are each a natural product produced by a metabolism effect of a plant, and are each in particular preferably a natural rubber/water system solution, in which a dispersing solvent is water. The number-average molecular weight of a natural rubber in the natural rubber latex used in the present invention is preferably 2,000,000 or more, more preferably 2,500,000 or more. About the natural rubber latex, concentrated latexes, fresh latexes called field latexes, and other latexes are usable without being distinguished from each other. The synthetic rubber latex solutions may be each a solution in which, for example, styrene-butadiene rubber, butadiene rubber, nitrile rubber, or chloroprene rubber is produced by emulsion polymerization.

Hereinafter, a description will be made about a method for producing the rubber wet masterbatch according to the present invention. In particular, in the present embodiment, a description will be made about an example in which a natural rubber latex solution is used as a rubber latex solution. This case makes it possible to produce a rubber wet masterbatch which has very high carbon black dispersibility and which gives, when made into a vulcanized rubber, low thermogenic performance and fatigue resistance each further improved to this rubber.

This production method includes step (I) in which at the time of dispersing a carbon black into a dispersing solvent, at least one portion of a natural rubber latex solution is added to the carbon-black-dispersed solvent to produce a slurry solution containing the carbon black to which natural rubber latex particles adhere, step (II) in which the slurry solution is mixed with the rest of the natural rubber latex solution to produce a rubber latex solution containing the above-mentioned natural-rubber-latex-particle-adhering carbon black, and step (III) in which the rubber latex solution containing the natural-rubber-latex-particle-adhering carbon black is solidified and dried. The carbon black used in the present invention is particularly a carbon black having an iodine adsorption number of 41 mg/g or less.

(1) Step (I)

In step (I), at the time of dispersing a carbon black into a dispersing solvent, at least one portion of a natural rubber latex solution is added to the carbon-black-dispersed solvent to produce a slurry solution containing the carbon black to which natural rubber latex particles adhere. It is allowable to mix the natural rubber latex solution beforehand with the dispersing solvent, and subsequently add the carbon black to the mixture to disperse the carbon black. It is also allowable to add the carbon black into the dispersing solvent, and next disperse the carbon black into the dispersing solvent while the natural rubber latex solution is added to the carbon-black-added dispersing solvent at a predetermined adding speed; or to add the carbon black into the dispersing solvent, and next disperse the carbon black in the dispersing solvent while fractions of the natural rubber latex solution, the respective amounts of the fractions being equal to each other, are added thereto through plural operations. By dispersing the carbon black into the dispersing solvent in the presence of the natural rubber latex solution, a slurry solution can be produced which contains the carbon black to which natural rubber latex particles adhere. The addition proportion of the natural rubber latex solution in step (I) is, for example, from 0.5 to 50% by mass of the total of the used natural rubber latex solution (the total of the solution added in steps (I) and (II)).

In step (I), the solid (rubber) proportion in the added natural rubber latex solution is preferably from 0.5 to 10% by mass, more preferably from 1 to 6% by mass of the carbon black. The solid (rubber) concentration in the added natural rubber latex solution is preferably from 0.5 to 5% by mass, more preferably from 0.5 to 1.5% by mass of the latex solution. In these cases, a rubber wet masterbatch heightened in carbon black dispersion degree can be produced while the natural rubber latex particles are caused to adhere certainly to the carbon black.

In step (I), the method for mixing the carbon black with the dispersing solvent in the presence of the natural rubber latex solution may be a method of using an ordinary dispersing machine to disperse the carbon black, examples of the machine including a high-shearing mixer, a High Shear Mixer, a homo-mixer, a ball mill, a bead mill, a high-pressure homogenizer, an ultrasonic homogenizer, and a colloid mill.

The "high-shearing mixer" denotes a mixer having a rotor rotatable at a high velocity and a fixed stator in which the rotor is rotated in the state that a precise clearance is set between the rotor and the stator, whereby a high-shearing effect acts. In order to generate such a high-shearing effect, it is preferred to set the clearance between the rotor and the stator, and the peripheral velocity of the rotor to 0.8 mm or less, and 5 m/s or more, respectively. Such a high-shearing mixer may be a commercially available product. An example thereof is a product "High Shear Mixer" manufactured by a company, Silverson.

In the present invention, at the time of mixing the carbon black with the dispersing solvent in the presence of the natural rubber latex solution to produce the slurry solution containing the natural-rubber-latex-particle-adhering carbon black, a surfactant may be added to the mixture to improve the carbon black in dispersibility. The surfactant may be a surfactant known in the rubber industry. Examples thereof include nonionic surfactants, anionic surfactants, cationic surfactants, and amphoteric surfactants. Instead of the surfactant or in addition to the surfactant, an alcohol such as ethanol is usable. However, it is feared that the use of the surfactant is to make rubber properties of the vulcanized rubber to be finally obtained low. Thus, the blend amount of the surfactant is preferably 2 parts or less by mass, more preferably 1 part or less by mass for 100 parts by mass of the solid (rubber) in the natural rubber latex solution. It is preferred not to use any surfactant substantially.

(2) Step (II)

In step (II), the slurry solution is mixed with the rest of the natural rubber latex solution to produce a rubber latex solution containing the natural-rubber-latex-particle-adhering carbon black. The method for mixing the slurry solution with the rest of the natural rubber latex solution in the liquid phase is not particularly limited. The method may be a method of using an ordinary dispersing machine to attain the mixing, examples of the machine including a high-shearing mixer, a High Shear Mixer, a homo-mixer, a ball mill, a bead mill, a high-pressure homogenizer, an ultrasonic homogenizer, and a colloid mill. As required, heat may be applied to the whole of the dispersing machine or any other mixing system at the time of mixing.

When the drying period and labor in the next step, step (III), are considered, it is preferred about the rest of the natural rubber latex solution that the solid (rubber) concentration therein is higher than that in the natural rubber latex solution added in step (I). Specifically, the solid (rubber) concentration is preferably from 10 to 60% by mass, more preferably from 20 to 30% by mass.

(3) Step (III)

In step (III), the rubber latex solution containing the natural-rubber-latex-particle-adhering carbon black is solidified and dried. The method for the solidification and drying may be a solidifying and drying method of incorporating a solidifier into the rubber latex solution containing the natural-rubber-latex-particle-adhering carbon black, and drying, after this solution is solidified, the solidified solution; or an exsiccating method of drying the latex solution without being solidified.

The solidifier used in the solidifying and drying method may be an acid, such as formic acid or sulfuric acid, or a salt, such as sodium chloride, that is usually usable for solidifying a rubber latex solution.

In the method for drying the carbon-black-containing natural rubber latex solution, various drying machines, such as an oven, a vacuum drier or an air drier, are usable.

In the present invention, it is allowable to incorporate a flocculant into the rubber latex solution containing the natural-rubber-latex-particle-adhering carbon black, which is obtained by mixing the slurry solution containing the natural-rubber-latex-particle-adhering carbon black with the natural rubber latex solution in the liquid phase, and subsequently collect and dry the resultant flocculated product. As the flocculant, a substance known as a flocculant for a rubber latex solution is usable without any restriction. A specific example of the flocculant is a cationic flocculant.

The rubber wet masterbatch obtained after step (III) contains the carbon black in an amount preferably from 20 to 150 parts by mass, more preferably from 40 to 90 parts by mass for 100 parts by mass of the rubber (solid). This case makes it possible to improve the vulcanized rubber to be finally obtained in low thermogenic performance, fatigue resistance, and an electric resistance decrease with a good balance between the former two properties and the latter.

In the natural rubber wet masterbatch obtained after step (III), the contained carbon black is evenly dispersed. Thus, the masterbatch is excellent in carbon black dispersion stability even when time elapses.

After step (III), the production method may have step (IV) in which the resultant rubber wet masterbatch is mixed with a dry rubber containing a diene based rubber as a main component in a dry manner. By causing the masterbatch to undergo this step, step (IV), a rubber composition improved remarkably in thermogenic performance and fatigue resistance can be produced. In the present invention, the wording "being mixed in a dry manner", or "mixing in a dry manner"

denotes that at least two mixing components, such as a rubber wet masterbatch and a dry rubber, are mixed with each other in the state of adjusting the water content by percentage in the whole of the mixing components into 5% or less. A specific method for the mixing in a dry manner is, for example, a method of mixing the mixing components with each other, using a kneading machine such as a Banbury mixer, an open roll, or a co-kneader.

The dry rubber, which contains a diene based rubber as a main component, may be a diene based rubber known by those skilled in the art. When the vulcanized rubber to be finally obtained is used for tires, it is preferred to use at least one selected from styrene butadiene rubber (SBR), natural rubber (NR), and polyisoprene rubber (IR). About the blend ratio between the rubber wet masterbatch and the dry rubber, which contains a diene based rubber as a main component, it is preferred to incorporate the dry rubber in an amount of 0 to 30 parts by mass for 100 parts by mass of the entire rubber components.

As required, compounding agents used ordinarily in the rubber industry are compounded into the rubber wet masterbatch obtained after step (III) or (Iv), examples of the agents including a sulfur-containing vulcanizer, a vulcanization promoter, silica, a silane coupling agent, zinc oxide, stearic acid, a vulcanization promoting aid, a vulcanization retarder, an organic peroxide, an anti-aging agent, softening agents such as a wax and an oil, and a processing aid. In this way, the rubber composition according to the present invention can be produced.

It is sufficient for the species of sulfur as the sulfur-containing vulcanizer to be a sulfur species for ordinary rubbers. Examples thereof include powdery sulfur, precipitated sulfur, insoluble sulfur, and highly dispersed sulfur. The sulfur content in the rubber composition for a tire according to the present invention is preferably from 0.3 to 6 parts by mass for 100 parts by mass of the rubber component(s). If the sulfur content is less than 0.3 part by mass, the vulcanized rubber is short in crosslinkage density to be lowered in rubber strength and others. If the sulfur content is more than 6.5 parts by mass, the vulcanized rubber is deteriorated, particularly, in both of heat resistance and fatigue resistance. In order to ensure the rubber strength of the vulcanized rubber satisfactorily and further improve the heat resistance and the fatigue resistance thereof, the sulfur content is set into the range more preferably from 1.5 to 5.5 parts by mass, even more preferably from 2 to 4.5 parts by mass for 100 parts by mass of the rubber component(s).

The vulcanization promoter may be a vulcanization promoter usable ordinarily for rubber vulcanization. Examples thereof include sulfenamide type vulcanization promoters, thiuram type vulcanization promoters, thiazole type vulcanization promoters, thiourea type vulcanization promoters, guanidine type vulcanization promoters, and dithiocarbamic acid salt type vulcanization promoters. These may be used alone or in the form of an appropriate mixture. The content of the vulcanization promoter(s) is preferably from 1 to 5 parts by mass for 100 parts by mass of the rubber component(s).

The anti-aging agent may be any anti-aging agent usable ordinarily for rubbers. Examples thereof include aromatic amine type, amine-ketone type, monophenolic type, bisphenolic type, polyphenolic type, dithiocarbamic acid salt type, and thiourea type anti-aging agents. These may be used alone or in the form of an appropriate mixture. The content of the anti-aging agent (s) is more preferably from 1 to 5 parts by mass, even more preferably from 2 to 4.5 parts by mass for 100 parts by mass of the rubber component(s).

The rubber composition according to the present invention can be obtained by kneading, in a kneading machine used in an ordinary rubber industry, the rubber masterbatch and the optional agents, examples of which include a sulfur-containing vulcanizer, a vulcanization promoter, silica, a silane coupling agent, zinc oxide, stearic acid, a vulcanization promoting aid, a vulcanization retarder, an organic peroxide, an anti-aging agent, softening agents such as a wax and an oil, and a processing aid. The kneading machine is, for example, a Banbury mixer, a kneader or a roll.

The method for blending the above-mentioned individual components with each other is not particularly limited. The method may be any one of the following: a method of kneading, in advance, the blending components other than the sulfur-containing vulcanizer, the vulcanization promoter, and any other vulcanization-related component to prepare a masterbatch, adding the other components to the masterbatch, and further kneading all the components; a method of adding the individual components in any order, and then kneading the components; a method of adding all the components to each other simultaneously, and then kneading the components; and other methods.

As described above, about the rubber wet masterbatch according to the present invention, a carbon black contained therein is evenly dispersed, and the dispersion stability of the carbon black is excellent over elapsing time. Thus, about a rubber composition produced by use of this rubber wet masterbatch, the carbon black contained therein is evenly dispersed, and the dispersion stability of the carbon black is excellent over elapsing time, as well. Furthermore, the carbon black is a carbon black having an iodine adsorption number of 41 mg/g or less. Thus, particles of the carbon black are close in distance to each other into such an appropriate degree that electrons can be transmitted therebetween while the carbon black is evenly dispersed in the rubber wet masterbatch. As a result, a vulcanized rubber using this rubber wet masterbatch can be decreased in electric resistance while improved in low thermogenic performance and fatigue resistance. In particular, a pneumatic tire having this vulcanized rubber, specifically, a pneumatic tire in which this vulcanized rubber is used as a tread rubber, a side rubber, a ply or belt coating rubber, or a bead filler rubber has a rubber portion that is a portion in which the carbon black is satisfactorily dispersed and that is further a portion decreased in electric resistance. Accordingly, the pneumatic tire is, for example, a tire that is decreased in rolling resistance and that is further excellent in low thermogenic performance and fatigue resistance.

EXAMPLES

Hereinafter, this invention will be more specifically described by demonstrating working examples of the invention. Raw materials and machines used therein are as follows:

Used Materials a) Carbon blacks:
Carbon black (HAF): "N330" (SEAST 3), (manufactured by Tokai Carbon Co., Ltd.; iodine adsorption number: 80 mg/g, DBP absorption number: 101 $cm^3/100$ g, and nitrogen adsorption specific surface area: $79 \times 10^3$ $m^2/kg$)
Carbon black (SRF): "N774" (SEAST S), (manufactured by Tokai Carbon Co., Ltd.; iodine adsorption number: 26 mg/g, DBP absorption number: 68 $cm^3/100$ g, and nitrogen adsorption specific surface area: $27 \times 10^3$ $m^2/kg$)
b) Dispersing solvent: water
c) Rubber latex solutions:
Natural rubber concentrated latex solution, manufactured by Regitex Co., Ltd.; "DRC (dry rubber content)"=60%, and mass-average molecular weight: 236,000

Natural rubber fresh latex solution (NR field latex), manufactured by a company, Golden Hope; "DRC (dry rubber content)"=31.2%, and mass-average molecular weight: 232,000)

d) Solidifier: formic acid (first class 85%, a 10% solution thereof was diluted to be adjusted into a pH of 1.2) (manufactured by Nacalai Tesque, Inc.)

e) Zinc flower: "#3 ZINC FLOWER" (manufactured by Mitsui Mining & Smelting Co., Ltd.)

f) Stearic acid (manufactured by NOF Corp.)

g) Wax (manufactured by Nippon Seiro Co., Ltd.)

h) Anti-aging agent: aminoketone type compound/2,2,4-trimethyl-1,2-dihydroquinoline polymer "RD", manufactured by Ouchi Shinko Chemical Industry Co., Ltd.; melting point: 80 to 100° C.

i) Sulfur-containing vulcanizer: insoluble sulfur (manufactured by Tsurumi Chemical Industry Co., Ltd.)

j) Vulcanization promoter:
N-tert-butyl-benzothiazylsulfenamide "SANCELER NS-G", manufactured by Sanshin Chemical Industry Co., Ltd.

k) Cobalt salt of a boron-containing organic acid: MANOBOND C680C, manufactured by a company, OMG l) Resorcin-alkylphenol-formalin resin "SUMIKANOL 620" (manufactured by Sumitomo Chemical Co., Ltd.)

m) Hexamethoxymethylmelamine "CYLETS 963L", (Mitsui Cytex, Ltd.)

n) Diene based dry rubbers to be added:
Polystyrene/butadiene rubber (SBR) "SBR 1502" (manufactured by Sumitomo Chemical Co., Ltd.)
Natural rubber (NR) "RSS #3" (produced in Thailand)

Evaluations

Evaluations were made about a rubber obtained by using a predetermined mold to heat and vulcanize each rubber composition at 150° C. for 30 minutes.

Low Thermogenic Performance of Vulcanized Rubber

The low thermogenic performance of a produced vulcanized rubber was evaluated in accordance with JIS K6265 through the loss tangent tan δ thereof. A rheospectrometer E4000 manufactured by UBM was used to measure the tan δ at 50 Hz and 80° C. under the condition of a dynamic strain of 2%. As the numerical value thereof is lower, the rubber is better in low thermogenic performance.

Fatigue Resistance of Vulcanized Rubber

The fatigue resistance of a produced vulcanized rubber was evaluated in accordance with JIS K6260. In the evaluation, the value of Comparative Example 1 is regarded as 100, and the measured value of the rubber is evaluated as an index relative thereto. As the numerical value is larger, the rubber shows a better fatigue resistance.

Electric Resistance Value of Vulcanized Rubber

The electric resistance value of a vulcanized rubber was measured in accordance with JIS K6911 (measuring conditions: an applied voltage of 1000 V, an air temperature of 25° C., and a humidity of 50%).

Example 1

To a thin solution of a portion of a natural rubber (NR) latex in water, the concentration thereof in the solution being adjusted to 0.5% by mass, were added 50 parts by mass of one of the carbon blacks. A device, ROBOMIX, manufactured by Primix Corp. was used to disperse the carbon black therein (ROBOMIX conditions: 9000 rpm for 30 minutes) to produce a slurry solution containing the carbon black to which natural rubber latex particles adhered (step (I)).

Next, a solution of the rest of the natural rubber latex (the solid (rubber) concentration in the solution was adjusted to 25% by mass by the addition of water) was added to the slurry solution containing the natural-rubber-latex-particle-adhering carbon black which was produced through step (I) to adjust the solid (rubber) amount in the total of the natural rubber latex solution used in step (I) and that used in this step to 100 parts by mass. Next, a household mixer, SM-L56 model, manufactured by Sanyo Electric Co., Ltd. was used to mix the entire components with each other (mixer conditions: 11300 rpm for 30 minutes) to produce a natural rubber latex solution containing the carbon black (step (II)).

A 10% by mass solution of formic acid in water, as the solidifier, was added to the natural rubber latex solution containing the carbon black, which was produced through step (II), until the pH of the solution turned to 4. A screw press, V-01 model, manufactured by Suehiro EPM Corp. was used to dry the solidified product until the water content by percentage therein turned to 1.5% or less. In this way, a natural rubber wet masterbatch (WMB) was produced (step (III)).

Various ones shown in Table 1, out of the above-mentioned additives, were incorporated into the resultant natural rubber wet masterbatch to prepare a rubber composition. A vulcanized rubber therefrom was measured about the above-mentioned physical properties. The results are shown in Table 1.

Examples 2 to 4

A rubber composition and a vulcanized rubber were produced in the same way as in Example 1 except that after step (III), step (IV) was performed in which the resultant rubber wet masterbatch was mixed with one or more dry rubbers shown in Table 1, out of the diene based dry rubbers to be added, in a dry manner. The physical properties of the vulcanized rubber are shown in Table 1.

Comparative Examples 1, 3 and 4

A rubber composition and a vulcanized rubber were produced in the same way as in Example 1 except that instead of the natural rubber wet masterbatch, a dry rubber masterbatch was used which was obtained by mixing one of the carbon blacks with 100 parts by mass of the natural rubber in a dry manner. The physical properties of the vulcanized rubber are shown in Table 1.

Comparative Example 2

A rubber composition and a vulcanized rubber were produced in the same way as in Example 1 except that the carbon black to be used was changed. The physical properties of the vulcanized rubber are shown in Table 1.

TABLE 1

|  |  |  | Comparative Example 1 | Comparative Example 2 | Comparative Example 3 | Comparative Example 4 | Example 1 | Example 2 | Example 3 | Example 4 |
|---|---|---|---|---|---|---|---|---|---|---|
| <Formulation> | | | | | | | | | | |
| WMB | NR | | — | 100 | — | — | 100 | 90 | 90 | 90 |
|  | Carbon blacks | N774 | — | — | — | — | 50 | 50 | 50 | 50 |
|  |  | N330 | — | 50 | — | — | — | — | — | — |
| Dry rubbers | NR | | 100 | — | 100 | 100 | — | 10 | — | 5 |
|  | SBR | | — | — | — | — | — | — | 10 | 5 |
| Carbon blacks | N774 | | — | — | 45 | 50 | — | — | — | — |
|  | N330 | | 45 | — | — | — | — | — | — | — |
| Anti-aging agent | | | 2 | 2 | 2 | 2 | 2 | 2 | 2 | 2 |
| Zinc flower | #3 ZINC FLOWER | | 8 | 8 | 8 | 8 | 8 | 8 | 8 | 8 |
| Resorcin-alkylphenol-formalin resin | | | 2 | 2 | 2 | 2 | 2 | 2 | 2 | 2 |
| Hexamethoxymethylmelamine | | | 4 | 4 | 4 | 4 | 4 | 4 | 4 | 4 |
| Insoluble sulfur | | | 4.5 | 4.5 | 4.5 | 4.5 | 4.5 | 4.5 | 4.5 | 4.5 |
| Vulcanization promoter | | | 1 | 1 | 1 | 1 | 1 | 1 | 1 | 1 |
| <Vulcanized rubber physical properties> | | | | | | | | | | |
| Fatigue resistance | | | 100 | 160 | 82 | 69 | 128 | 132 | 121 | 126 |
| Electric resistance value ($\times 10^7$ Ω) | | | 7 | 180 | 73 | 10 | 8.6 | 9.2 | 9.1 | 9.3 |
| Low thermogenic performance (tanδ) | | | 0.125 | 0.098 | 0.11 | 0.121 | 0.108 | 0.101 | 0.112 | 0.109 |

From the results in Table 1, it is understood that the vulcanized rubber from the rubber composition containing the rubber wet masterbatch according to each of Examples 1 to 4 were made better in fatigue resistance and low thermogenic performance than the vulcanized rubber from the rubber composition according to Comparative Example 1. Additionally, the vulcanized rubber when the carbon black dispersibility therein was excellent was improved in electric resistance value (Comparative Example 2) while Examples 1 to 4 were equivalent in electric resistance value to Comparative Example 1.

The invention claimed is:

1. A rubber wet masterbatch comprising: a carbon black, a dispersing solvent, and a latex solution of a rubbers as raw materials, wherein the carbon black has an iodine adsorption number of 41 mg/g or less, and wherein the rubber wet masterbatch is obtained through the following process: first, at the time of dispersing the carbon black into the dispersing solvent, at least one portion of the rubber latex solution is added to the carbon-black-dispersed solvent to produce a slurry solution comprising the carbon black to which rubber latex particles adhere, subsequently the slurry solution is mixed with the rest of the rubber latex solution, and then the mixture is solidified and dried, wherein the rubber wet masterbatch is vulcanized to form a vulcanized rubber having an electric resistance value less than $10^8$ Ω·cm.

2. The rubber wet masterbatch according to claim 1, wherein the carbon black also has a DBP absorption number of 80 cm$^3$/100 g or less.

3. The rubber wet masterbatch according to claim 1, wherein the carbon black is 40 to 150 parts by mass for 100 parts by mass of the rubber.

4. A rubber composition, comprising the rubber wet masterbatch recited in claim 1.

5. The rubber composition according to claim 4, comprising the rubber wet masterbatch; and a dry rubber;
   wherein the dry rubber comprises, as a main component, a diene based rubber.

6. A vulcanized rubber, obtained by vulcanizing the rubber composition recited in claim 4, wherein the vulcanized rubber has an electric resistance value less than $10^8$ Ω·cm.

7. The vulcanized rubber according to claim 6, wherein the vulcanized rubber also has the real number of the loss tangent (tan δ) of the rubber being 0.120 or less.

8. A ply topping rubber, comprising the vulcanized rubber recited in claim 6.

9. A pneumatic tire comprising the ply topping rubber recited in claim 8.

* * * * *